Oct. 19, 1937.  H. S. GEORGE  2,096,171
WELDING PROCESS AND APPARATUS
Filed June 5, 1934  2 Sheets-Sheet 1
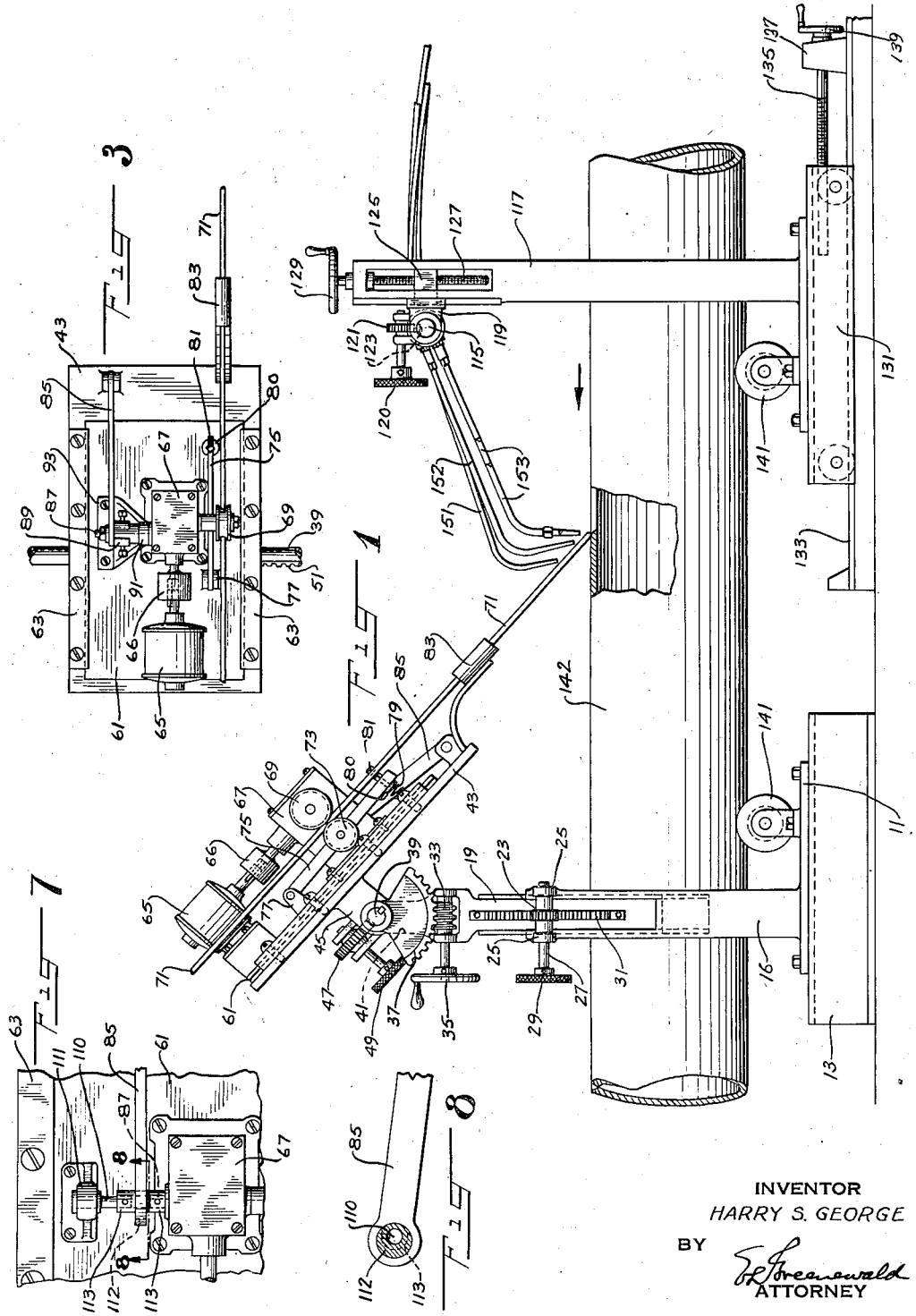
INVENTOR
HARRY S. GEORGE
BY
ATTORNEY Oct. 19, 1937.  H. S. GEORGE  2,096,171
WELDING PROCESS AND APPARATUS
Filed June 5, 1934   2 Sheets-Sheet 2
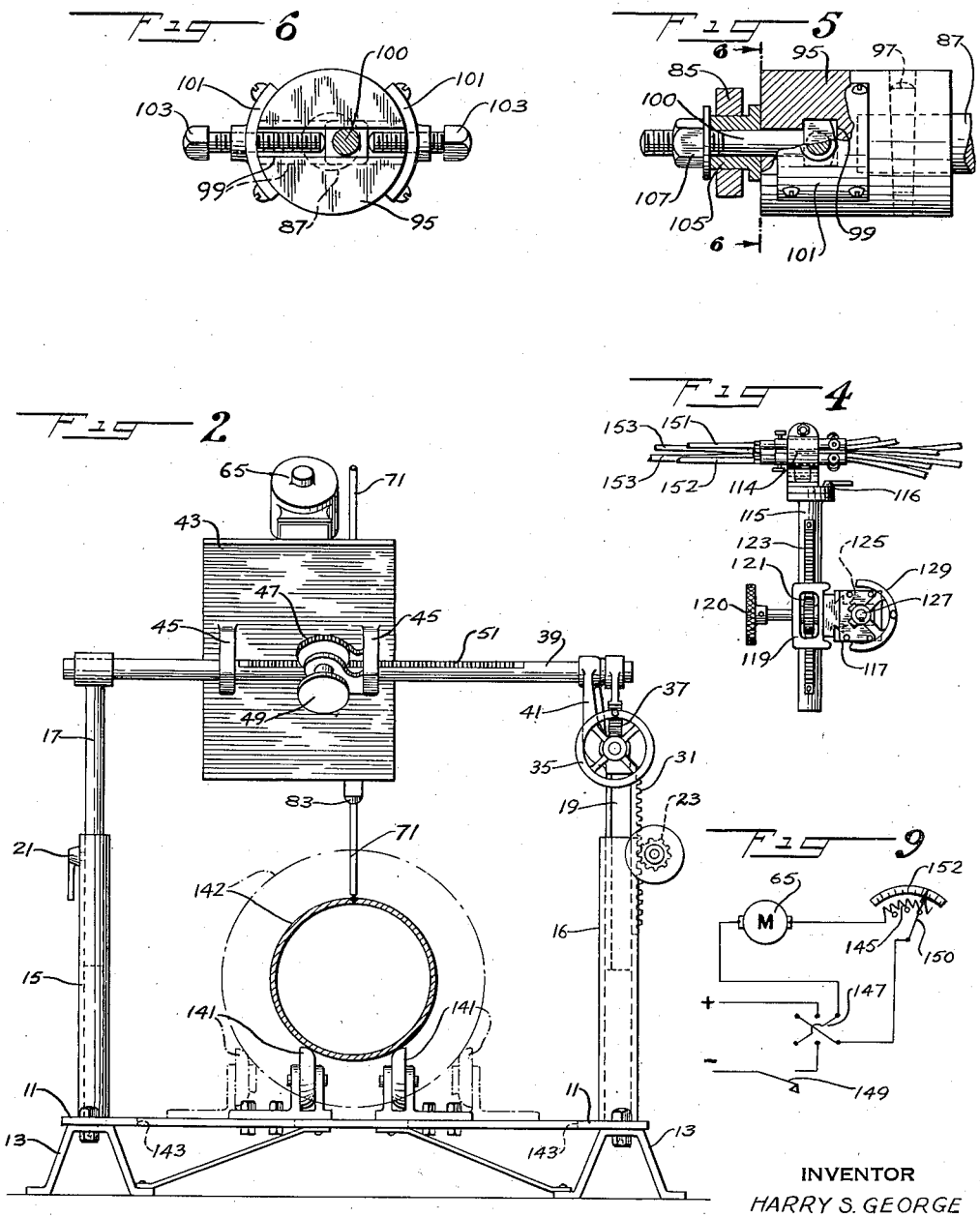

Patented Oct. 19, 1937

2,096,171

UNITED STATES PATENT OFFICE 2,096,171

WELDING PROCESS AND APPARATUS

Harry S. George, Massapequa, N. Y., assignor, by mesne assignments, to Union Carbide and Carbon Corporation, a corporation of New York Application June 5, 1934, Serial No. 729,078

22 Claims. (Cl. 113—59)

The present invention relates to the heating and welding of metals, and more especially it concerns a process and apparatus for the welding together of metals along a seam by means of a high temperature flame produced by the regulated combustion with oxygen or the like of a combustible gas such as acetylene.

For many purposes oxy-acetylene welding is preferred to arc-welding processes. One characteristic of arc-welding processes is that the positive electrode does not rest in the puddle of molten metal at the weld V, but is positioned a short distance above the same. Should the arc momentarily fail, the positive electrode of weld metal is safe from injury in all events.

The usual welding technique when using an oxy-acetylene flame differs from arc-welding technique, in that in the former case the end of the welding rod generally extends into the liquid metal puddle produced in the V by the welding flame. At the high speeds at which the welding process is conducted, the welding rod need not be heated above its melting point. In fact, in many instances weld metal may not be actually fluid, but, instead, be in a so-called mushy or semi-fluid state, somewhat similar to a slush of ice crystals and water. Likewise, in such instances the walls of the V preferably are not raised to their true melting temperature, but have merely a superficially-fused surface film of an iron-carbon alloy that melts at a temperature substantially lower than the main body of metal, as more fully described in my copending application Serial No. 465,779, filed July 3, 1930 for Welding process, which was issued September 11, 1934 as Patent No. 1,973,341. In operations conducted under these or similar conditions, or where for any reason the welding heat produced by the flame momentarily becomes insufficient to maintain the puddle properly fluid, the lower portion of the rod sticks or freezes in the puddle. When this happens in an operation using a mechanically-fed welding rod, the latter then will bend and buckle, often becoming so deformed that it must be replaced. The automatic welding operation under such conditions is interrupted, and considerable quantities of welding rod are rendered unfit for use.

The present invention is based upon the discovery by applicant that by means of certain manipulative treatments of the welding rod during the welding operation these objectionable difficulties can be avoided.

Among the more important objects of the present invention are: to provide in novel manner for rapidly and uniformly stirring or agitating the puddle of metal at a welding zone and of forcing the melted or mushy welding rod into the puddle and against the walls of the scarf; to provide a novel welding rod feeding mechanism which will prevent rod buckling under all conditions; to provide in novel manner for reciprocating a welding rod in a scarf, particularly while preheating the rod and the scarf adjacent an end thereof; to provide for readily adjusting the amplitude and frequency of the reciprocating motion of a welding rod during a welding operation; and to provide an apparatus for the purpose that is simple in construction and is adapted for automatic or semi-automatic operation.

Broadly my invention includes a pair of cooperating feed rolls between which the welding rod is yieldingly held, and a motor adapted to drive one of the feed rolls through suitable reduction gearing mounted on a slidable platform carried by a base. The base is connected with the motor and platform through reduction gearing, a pivoted lever arm, and an eccentric connection, whereby during operation of the motor the platform and parts carried thereby are rapidly reciprocated in the plane of the welding rod. An adjustable eccentric connection makes possible the regulation of the amplitude of the reciprocations. The frequency of the reciprocations are controlled by adjustment of the motor speed.

Referring now to the drawings illustrating certain embodiments of the invention:—

Fig. 1 is a side elevation of the welding rod feeding apparatus and associated elements, parts being cut away;

Fig. 2 is an end elevation, partly in section, of the apparatus shown in Fig. 1, parts being omitted;

Fig. 3 is a plan view of one form of welding rod feeding mechanism and associated parts;

Fig. 4 is a plan view of the adjustable welding head-carrying member shown in Fig. 1;

Fig. 5 is a side view of the eccentric member construction shown in Fig. 3, parts being broken away;

Fig. 6 is a vertical section along the lines 6—6 of Fig. 5, looking in the direction of the arrows;

Fig. 7 is a fragmental plan view of another form of eccentric drive member and associated parts;

Fig. 8 is a vertical section taken along the lines 8—8 of Fig. 7, looking in the direction of the arrows; and Fig. 9 is a wiring diagram of the motor-operating circuit.

Referring now to the drawings, numeral 11 designates generally a base plate supported on legs 13, 13. Mounted on the base plate at opposite sides thereof are vertical supporting members 15, 16, having adjustable members 17, 19 slidable therein. The member 15 is provided with a suitable clamp 21 for locking the member 17 in selected position.

The member 16 carries a pinion 23 secured upon a shaft 27 mounted in bearings 25, 25, and operated through the knurled wheel 29. The pinion 23 cooperates with a rack 31 on the member 19 for vertical adjustment of the latter.

A worm gear 33 is rotatably mounted on the upper margin of the member 19, and is regulatable through handwheel 35. The gear 33 meshes with a segmental gear 37 keyed to an end of a shaft 39 rotatably supported in bearings respectively carried upon the upper end of the member 17 and upon an arm 41 mounted upon the upper part of member 19.

A flat, normally stationary support or platform 43 carried upon the shaft 39 has depending ears or flanges 45, 45 through apertures in which the shaft 39 is freely slidable. The construction of parts is such that while the platform is tiltable, no rotational movement thereof with respect to the shaft can occur. For facilitating lateral movement of the platform, a pinion 47 controlled by a knurled member 49 is mounted on a lateral extension of one ear 45,—and engages a rack 51 carried by the shaft 39.

The welding rod feeding mechanism comprises a freely movable platform 61 carried by the support 43 and adapted to be reciprocated upon the latter in a plane perpendicular to the axis of the shaft 39. The side margins of the platform 61 fit into lateral guides 63, 63 carried by the member 43.

Mounted on the movable platform 61 is a motor 65 operatively connected through a coupling 66 and a set of reduction gears in a housing 67, with a peripherally grooved roll or wheel 69 designed to engage a portion of the lateral surface of a welding rod 71 during a welding operation. The coupling 66 is rigidly secured to the main gear of housing 67; and the motor shaft also is so keyed to the coupling as to permit free relative sliding movement of the shaft and coupling. In the form of the invention shown a rigid coupling may be substituted for that shown. However, in instances where the motor is mounted elsewhere than on the movable platform, the slidable coupling or its equivalent is required. The motor 65 preferably is of the alternating current, universal type, capable of being operated at various selected speeds and of being reversed at will. A grooved idler roll or wheel 73 is mounted upon a lever 75 for rotation in the plane of rotation of the driven wheel 69. The lever 75 is pivotally connected at one of its ends to a post 77 mounted upon the movable platform 61. At the other end of the lever, a compression spring 79 is operatively interposed between the platform 61 and a disk or limiting member 80, secured to the end of a bolt 81 having threaded engagement with the wall of an aperture extending through the lever. The construction is such that by turning the bolt 81 when the wheel 73 is resting against a welding rod, the compression exerted by the spring may be varied selectively to increase or decrease the pressure exerted upon the welding rod by the idler wheel 73. A welding rod guide 83 is mounted on the stationary platform 43.

For providing for the rapid reciprocation of the welding rod during feeding of the same to a welding operation, the motor 65 is operatively connected with a lever member 85 by means of reduction gearing housing 67, a countershaft 87, and an eccentric device 89 associated with the latter and with which the lever 85 is rotatably connected. The countershaft and eccentric device are supported in part by a sleeve bearing 91 carried on a standard 93. The lever 85 also is pivotally connected with the stationary platform 43.

In the modification of the invention shown in Figs. 3, 5 and 6, the eccentric device comprises a cylindrical member 95 mounted centrally at an end of shaft 87 and secured thereto, as by a key 97. A T-shaped lateral groove 99 extends transversely of the member 95, and is adapted to accommodate a bolt or headed shaft 100 for lateral sliding movement therein, with the free end of the bolt extending beyond the end of the member 95. A pair of limiting plates 101, 101 close the lateral sides of the groove 99; and each plate is drilled and tapped to accommodate threaded adjusting screws or bolts 103, 103, the ends of which normally bear against opposite sides of the bolt 100 for lateral adjustment and locking in position of the latter. Carried by the member 100 is a bearing 105, upon which an end of the lever 85 is rotatably mounted. The degree of eccentricity imparted by the device 89 is regulated by lateral movement of the member 100 in the groove 99. A washer and a locknut 107, or their equivalent, insure maintenance of the selected degree of eccentricity and retain the lever in position.

In the form of the invention shown in Figs. 7 and 8, a jack shaft 110, having an end supported in bearings in a bracket 111, is provided in line with the shaft 87. The lever 85 has an aperture at the end thereof adjacent the shaft 87 which accommodates for rotation therein a member 112 having aligned laterally-extending sleeves 113, 113 respectively offset from the center of its midportion, and adapted to have secured therein the adjacent ends of the shafts 87 and 110.

For welding pipe or other materials to be joined, there may be provided one or more torches, adjustably carried by a supporting and locking member 114 mounted for rotation in a vertical plane upon a horizontal arm 115, and adapted to be locked in position by a member 116. The arm 115 is supported upon a standard 117 by means of a tubular collar member 119 having rotatably mounted thereon a pinion 121 cooperating with a rack 123 on the arm 115 for moving the arm longitudinally of the standard 117 under action of a wheel 120. The collar has a tongue portion fitting into a corresponding groove in a block member 125 having a sliding fit with a slotted portion of the standard for vertical sliding movement. The block 125 has a threaded aperture therein adapted to receive the threaded shaft 127 of a rotatable adjusting member mounted on the standard and operated through a handwheel 129. The standard 117 is mounted on a wheeled base 131 for limited movement on a fixed trackway 133 under action of a threaded screw 135 mounted in a block 137 for rotation when actuated by a handwheel 139.

Spaced pairs of rollers 141, 141, mounted respectively upon the bases 11 and 131 are adapted to support the pipe 142 or other objects to be welded, for movement thereof past the welding heads and welding rod. The rollers 141 of each pair are laterally adjustable in slots 143 to adapt them to accommodate pipes or the like of various diameter.

In the form of the invention illustrated, adapted for the continuous welding of pipe, a rheostat 145 and a reversing switch 147 are arranged in the power circuit in series with the motor 65, as is shown in Fig. 9. A main switch 149 controls the current flow to the motor. An indicator 150 and a calibration chart 152 traversed thereby is associated with the rheostat, which preferably is located close to the operator for convenient control.

The arm 115 carries a plurality of independently regulatable welding heads having welding nozzles 151, 152, 153, 153, and suitable connections for the supply of acetylene and oxygen or the like to each.

In a preferred arrangement, when welding plates ⅜ inch in thickness, two laterally-spaced nozzles 153, 153, are directed to impinge their flames upon the lower end of the welding rods 71 and the base metal within the scarf. A rod-preheating nozzle 151 impinges a flame upon the rod at a point somewhat remote from the scarf and at a smaller acute angle with respect to the direction of rod movement than the nozzles 153. Another rod-preheating nozzle 152 is directed to impinge a flame upon the rod midway between the flames produced by nozzles 151 and 153 and at a still smaller acute angle with respect to the rod than the nozzle 151.

During a welding operation, using the apparatus shown, the pipe or material to be welded is moved along upon the rollers 141, 141, by appropriate means (not shown),—the abutting margins of the pipe at the seam to be welded previously having been bevelled in well-known manner to form a scarf. Prior thereto the welding rod-feeding mechanism has been positioned by means of members 29, 35, and 49 so as to direct the welding rod into the scarf at the desired angle,—and the torches have been properly positioned in the manner indicated above by means of the members 114, 120, 129, and 139. As the parts to be welded pass into the welding zone at the scarf adjacent the tips 153, 153, a puddle of molten metal is formed at the base of the welding rod 71 under the action of the preheating nozzles 151, 152, and the welding nozzles 153, 153.

The welding rod 71 is continuously fed forward by the members 69, 73, at a rate substantially corresponding to the rate of its consumption in the welding operation. The rate of linear movement of the welding rod is regulated by adjusting the speed of the motor by means of the rheostat. Concurrently, a secondary or reciprocating movement of the welding rod is effected during operation of the motor, the amplitude of which is controlled by adjusting the set screws 103, 103, of the eccentric device. The frequency of the reciprocation is regulated by adjusting the motor speed in the manner indicated, or by employing a selective transmission in place of the simple reduction gears in housing 67. By calibrating the rheostat, and marking the calibrations on the chart 152, it is possible to secure instantly the conditions of welding rod-feed rate and oscillation frequency found most suitable for any particular size and kind of pipe or objects to be welded.

The following examples are submitted merely for purposes of illustrating the invention, and are not in any sense to be regarded as limiting the scope thereof.

In butt welding single V-seams in plates ⅜ inch in thickness, originally spaced around 1/16 to ⅛ inch apart, employing the "backward welding" method and a 1/16 inch diameter welding rod, the nozzles 153, 153 used had effective orifices of .15 inch, and operated at 45 pounds oxygen pressure; the nozzles 151 and 152 had effective orifices of .11 inch and .15 inch respectively,— and operated at 30 and 20 pounds per square inch oxygen pressure respectively. The welding rate was 60 linear feet per minute, and the rod deposited 30 pounds of metal per hour. The welding rod was fed at a rate of 60 feet per hour, and the frequency and amplitude of the reciprocations of the welding rod were 60 cycles per minute and ¼ inch throw, respectively. This welding rate may be greatly increased, to say 100 or more linear feet per hour.

The welding efficiency can be substantially increased in the above operation by utilizing a slightly smaller welding rod (⅜ inch diameter) and using lower oxygen pressures, the torch 151 and the three remaining torches having diameters of .08 inch and .07 inch, respectively. However, the welding rate is then considerably reduced, and the rate of feed of the welding rod becomes somewhat greater than the linear welding speed. In all of the above instances, the welds produced showed excellent tensile strengths and ductilities.

It is within the scope of the invention to substitute for the apparatus shown, other apparatus including a torch or torches and a support for the welding rod feeding mechanism adapted to be moved in unison along the seam of a stationary tubular member or pair of plates to be welded.

Furthermore, while I have indicated separate drives for the rod-feeding mechanism and for the conveying means for the materials being welded, it is to be understood that both of these may be driven by the same or synchronous mechanisms.

The practice of the present invention eliminates the usual tendency of the welding rod to stick or "freeze" to the solid base metal at the bottom or sides of the molten puddle in the scarf. In the event of an incipient slight sticking of the rod in the puddle, the pull or thrust produced by the secondary or reciprocating motion,—being in line with the rod itself,—is less liable to bend or put a permanent kink in the rod at the red hot end. Should sticking occur, injury to the rod is prevented by slippage of the feed rolls 69, 73, when the yielding frictional feeding action of these rolls upon the rod, regulated by the spring 79, has been overcome.

The uniform secondary or reciprocating motion of the welding rod with an amplitude of at least about ⅛ inch is practically indispensable in connection with the use of mechanically-fed welding rods where the rod is inclined; and it is also of great utility when using manually-fed welding rods. Homogeneous and sound welds are thus produced by the resultant substantial agitation of the fluid or semi-fluid weld metal in the V. Especially in welding operations in which this weld metal is more or less mushy or semi-fluid, the movement of the welding rod forces or compacts the mushy mass into place against the walls of the V and provides an intimate bond therewith.

The invention particularly is adapted for use with that process of welding,—utilizing the carburizing flame,—more fully described in my aforementioned copending application, although the so-called neutral flame can be used with equal facility.

The rheostat control permits occasional variations in the speed of the rod-feeding mechanism to compensate for ordinary irregularities in a welding operation. The reversing switch permits ready reversal of the direction of rod feed so as quickly to retract the rod from the scarf when required.

The motor may be mounted, if desired, upon the stationary support 43 or elsewhere, being connected with the gears in housing 67 by a flexible drive connection or coupling.

The invention is susceptible of modification within the scope of the appended claims.

I claim:

1. Welding apparatus comprising means for producing a welding heat; and means for continuously feeding a fusible welding rod toward and from work while continuously reciprocating the rod; the last-named means comprising a stationary support, a platform movable on said support, a variable-speed motor, means including a driven member and a yielding member adapted pressingly to engage a welding rod for feeding the latter toward the work at an acute angle with respect to the surface of the work; and means for reciprocating the last-named means and welding rod, including a driven eccentric device mounted on the said platform and pivotally associated with the said support.

2. Apparatus as defined in claim 1 wherein the eccentric device comprises a rotatable member, a shaft having its longitudinal axis in alignment with the longitudinal axis of the rotatable member and secured thereto at one end, means connecting the said shaft with the motor, the said rotatable shaft having a slot formed in and extending laterally across the same at the opposite end thereof and having the inner portion of the slot enlarged, a second shaft laterally slidable in the said slot but not rotatable therein, means for locking the last-named shaft in selected position longitudinally of the slot, and means pivotally connected with the said support and rotatable with respect to the last-named shaft.

3. Apparatus as defined in claim 1 wherein the eccentric device comprises a rotatable member, a shaft having its longitudinal axis in alignment with the longitudinal axis of the rotatable member and secured thereto at one end, means connecting the said shaft with the motor, the said rotatable member having a slot extending laterally across the same at the opposite end thereof and having the inner portion of the slot enlarged, a second shaft laterally slidable in the said slot but not rotatable therein, adjustable means for locking the last-named shaft in selected position longitudinally of the slot, and means pivotally connected with the said support and rotatable with respect to the last-named shaft.

4. Welding apparatus comprising means for producing a welding heat, a support therefor adjustable in a plurality of planes, and a welding rod-feeding mechanism comprising a variable-speed motor, a stationary support and a reciprocatable platform carried thereby, a rod-feeding member mounted on the platform and operatively connected with the motor, a yielding member cooperating with the said feeding member and adapted pressingly to engage a welding rod interposed between the latter and the yielding member, and an eccentric supported upon the platform and pivotally connected with the said stationary support, the said eccentric being adapted to be driven by the said motor.

5. Welding apparatus comprising means for producing a welding heat, an adjustable support therefor, and a welding rod-feeding mechanism comprising a variable-speed motor, a tiltable stationary support and a reciprocatable platform carried thereby, a rod-feeding member mounted on the platform and operatively connected with the motor, a yielding member cooperating with the said feeding member and adapted pressingly to engage a welding rod interposed between the latter and the yielding member, an eccentric supported upon the platform, means pivotally connecting the eccentric with the said tiltable support, the said eccentric being adapted to be driven by the said motor, and means for regulating the spacing between the said heat-producing means and said stationary support.

6. Welding apparatus comprising means for producing a welding heat, and a welding rod-feeding mechanism comprising a variable-speed motor, a stationary support, and a platform reciprocatable upon the said support in cycles of low frequency and along a path of small amplitude, a rod-feeding member mounted on the platform and operatively connected with the motor, a yielding member cooperating with the said feeding member and adapted pressingly to engage a welding rod interposed between the latter and the yielding member, an eccentric supported upon the platform, and means pivotally connecting the eccentric with the said support, the said eccentric being adapted to be driven by the said motor.

7. Welding apparatus comprising means for producing a welding heat, and a welding rod-feeding mechanism comprising a reversible, variable-speed motor disposed in an electric power circuit, a rheostat and a reversing switch arranged in series with the motor in the said circuit, a stationary support, and a reciprocatable platform carried thereby, a rod-feeding member mounted on the platform and operatively connected with the motor, a yielding member cooperating with the said feeding member and adapted pressingly to engage a welding rod interposed between the latter and the yielding member, an eccentric supported upon the platform, and means pivotally connecting the eccentric with the said support, the said eccentric being adapted to be driven by the said motor.

8. In welding apparatus comprising means for producing a welding heat and supporting means therefor adjustable vertically, longitudinally and transversely of an object to be welded, a welding rod feeding mechanism which includes means for disposing a welding rod at an acute angle with respect to the surface of the work to be welded, a reversible, variable-speed power mechanism continuously operable for reciprocating the said rod toward and away from the object to be welded, means continuously operable for giving the rod a resultant forward speed toward the said object approximately equal to the rate of consumption of the rod, the last-named means comprising a driven member and a yielding member cooperating therewith.

9. Welding rod feeding mechanism comprising means for supporting a welding rod adjacent work to be welded, power mechanism continuously operable for reciprocating the said rod in directions toward and away from the work, adjustable means for regulating the amplitude of the reciprocations, and means continuously operable for giving the rod a resultant forward speed toward the said work approximately equal to the rate of consumption of the rod, the last-named means comprising a driven member and a yielding member cooperating therewith.

10. Welding rod feeding mechanism comprising means for supporting a welding rod adjacent work to be welded, power mechanism continuously operable for reciprocating the said rod in directions toward and away from the work, adjustable means for regulating the amplitude of the reciprocations, and means continuously operable for giving the rod a resultant forward speed toward the said work approximately equal to the rate of consumption of the rod, the last-named means comprising a driven member and an adjustable yielding member cooperating therewith.

11. Welding apparatus comprising means for supporting a welding rod adjacent objects to be welded, reversible, variable-speed power mechanism, means for giving the said rod reciprocations of regulated frequency and amplitude, the last-named means comprising a calibrated rheostat arranged in an electric circuit in series with the power mechanism, an adjustable eccentric member driven by the power mechanism, means pivotally connecting the eccentric member with a fixed support, and means driven by the said power mechanism continuously operable for giving the rod a resultant forward speed toward the work approximately equal to the rate of consumption of the rod, the last-named means comprising a driven member and an adjustable yielding member cooperating therewith.

12. The process of feeding a welding rod to a welding zone, which comprises supporting a welding rod at a selected acute angle with respect to the surface at the welding zone of members to be united, reciprocating the welding rod lengthwise to provide uniform reciprocations of small amplitude and regulated frequency while concurrently feeding the rod continuously by means of a regulatable frictional force to provide a resultant forward welding-rod speed toward the welding zone substantially corresponding to the rate of consumption of the rod, and discontinuing the said forward feed when the resistance thereto exceeds a selected maximum.

13. The process of feeding a welding rod to a welding zone, which comprises supporting a welding rod at a selected acute angle with respect to members to be united, reciprocating the welding rod lengthwise to provide reciprocations of small amplitude and regulated frequency while concurrently feeding the rod continuously by means of a regulatable force to provide a resultant forward welding-rod speed toward the work substantially corresponding to the rate of consumption of the rod, and discontinuing the said feeding and the reciprocation of the welding rod when resistance thereto exceeds a selected maximum.

14. The process of feeding a welding rod to a welding zone which comprises supporting a welding rod at a selected angle with respect to members to be united, reciprocating the welding rod lengthwise to provide reciprocations of small amplitude and regulated frequency while concurrently feeding the rod continuously by means of a regulatable force to provide a resultant forward welding rod speed toward the work substantially corresponding to the rate of consumption of the rod, and regulating the amplitude of the reciprocations independently of the rate of forward feed of the welding rod.

15. In welding rod feeding mechanism, a support, a platform movable upon said support, means carried by the platform for feeding a welding rod at a selected rate to a welding zone, means for actuating the said means, and mechanism for reciprocating the said platform.

16. Welding apparatus comprising reciprocating means adapted for feeding a fusible welding rod toward and from work, the said means including a stationary support; a movable support; a variable-speed motor; a member continuously driven thereby and adapted operatively to engage a welding rod; a yielding member cooperating with the said driven member and adapted yieldingly to engage the said rod; an eccentric member operatively connected with the motor; and means pivotally mounted upon the stationary support and operatively connected with the said eccentric member; the respective driven member, yielding member and eccentric member being mounted on the movable support.

17. Welding apparatus comprising reciprocating means adapted for feeding a fusible welding rod toward and from work, the said means including a stationary support; a movable support; a variable-speed motor; a member continuously driven thereby and adapted operatively to engage a welding rod; a yielding member cooperating with the said driven member and adapted yieldingly to engage the said rod; an eccentric member operatively connected with the motor; means pivotally mounted upon the stationary support and operatively connected with the said eccentric member; and means for regulating the degree of eccentricity of the eccentric member for selectively varying the amplitude of the reciprocations of a welding rod; the respective driven member, yielding member, and eccentric member being carried by the movable support.

18. Welding apparatus comprising reciprocating means adapted for feeding a fusible welding rod toward and from work, the said means including a stationary support; a movable support; a variable-speed motor; a member continuously driven thereby and adapted operatively to engage a welding rod; a yielding member cooperating with the said driven member and adapted yieldingly to engage the said rod; an eccentric member operatively connected with the motor; means pivotally mounted upon the stationary support and operatively connected with the said eccentric member; and means for regulating the amplitude of the welding rod reciprocations independently of the rate of forward feed of the said rod; the respective driven member, yielding member, eccentric member, and regulating means being mounted on the movable support.

19. Welding apparatus comprising reciprocating means adapted for feeding a fusible welding rod toward and from work, the said means including a stationary support; a movable support; a variable-speed motor; a member continuously driven thereby and adapted operatively to engage a welding rod; a yielding member cooperating with the said driven member and adapted yieldingly to engage the said rod; an eccentric member operatively connected with the motor; means pivotally mounted upon the stationary support and operatively connected with the said eccentric member; and calibrated means for regulating the frequency of the reciprocations of the said reciprocating means.

20. Welding apparatus comprising reciprocating means adapted for feeding a fusible welding rod toward and from work, the said means including a stationary support; a movable support; a variable speed motor; a member continuously driven thereby and adapted operatively to engage a welding rod; a resiliently mounted member yieldingly engaging the said rod and adapted to cooperate with the said driven member; an eccentric member operatively connected with the motor; and means pivotally mounted upon the stationary support and operatively connected with the said eccentric member; the respective driven member, resiliently mounted member, and eccentric member being carried on the movable support.

21. Apparatus comprising means for supporting a welding rod at a selected acute angle with respect to members to be united at a welding zone, means for continuously feeding such welding rod to the welding zone at a selected rate, means for reciprocating such welding rod longitudinally thereof toward and away from the said zone to provide reciprocations of uniform small amplitude and regulated frequency, and means adapted to render ineffective the said rod-reciprocating means and the said feeding means when resistance to the feed of the rod exceeds a selected maximum.

22. Apparatus comprising means for supporting a welding rod at a selected acute angle with respect to members to be united at a welding zone, means for continuously feeding such welding rod to the welding zone at a selected rate, means for reciprocating such welding rod longitudinally thereof toward and away from said zone to provide reciprocations of uniform small amplitude and regulated frequency, and means for regulating the amplitude of the reciprocations of the said reciprocating means.

HARRY S. GEORGE.